United States Patent [19]
Tanaka et al.

[11] Patent Number: 5,583,574
[45] Date of Patent: Dec. 10, 1996

[54] VIDEO-DATA TRANSMITTER, VIDEO-DATA RECEIVER, AND VIDEO-DATA TRANSCEIVER FOR CONNECTING PARALLEL VIDEO-DATA INTO SERIAL VIDEO-DATA AND VICE VERSA

[75] Inventors: Masatoshi Tanaka, Kashihara; Kenshi Taniguchi, Katano; Tomotaka Takeuchi, Osaka, all of Japan

[73] Assignee: Matsushita Electric Industrial Co., Ltd., Osaka, Japan

[21] Appl. No.: 273,132

[22] Filed: Jul. 14, 1994

[30] Foreign Application Priority Data

Jul. 14, 1993 [JP] Japan .................................. 5-174069
Aug. 23, 1993 [JP] Japan .................................. 5-207575

[51] Int. Cl.$^6$ .......................... H04N 7/08; H04N 11/00; H04N 11/08; H04N 7/52
[52] U.S. Cl. .......................... 348/434; 348/489; 348/526; 348/479; 370/528; 370/536
[58] Field of Search .................................. 348/435, 434, 348/432, 489, 476, 477, 478, 474, 473, 472, 426, 479, 525, 526, 513, 514, 386, 471; 370/105.1, 105.4, 111, 100.1; H04N 7/08, 7/083, 7/084, 7/085, 7/087, 7/088, 7/24, 7/52, 1/08, 11/00

[56] References Cited

U.S. PATENT DOCUMENTS

| | | | |
|---|---|---|---|
| 3,666,888 | 5/1972 | Sekimoto | 348/415 |
| 4,542,406 | 9/1985 | Shimoyama et al. | 348/472 |
| 4,654,696 | 3/1987 | Dayton et al. | 358/11 |
| 4,706,109 | 11/1987 | Murray | 358/12 |
| 4,729,022 | 3/1988 | Shibuya et al. | 358/146 |
| 4,866,522 | 9/1989 | Beckley | 358/145 |
| 4,908,697 | 3/1990 | Tsinberg et al. | 358/12 |
| 4,994,899 | 2/1991 | Rhodes | 358/11 |
| 5,138,440 | 8/1992 | Radice | 348/489 |
| 5,442,405 | 8/1995 | Tamiguchi et al. | 348/525 |

OTHER PUBLICATIONS

*SMPTE Journal*, vol. 98, No. 9, Sep. 1989, *SMPTE Historical Reflections* and pp. 722–725.
*SMPTE Journal*, vol. 101, No. 4, Apr. 1992, *Progress Report 1991*, pp. 304–319.
International Telecommunications Union, *Recommendations of the CCIR 1990*, vol, XI, part 1, pp. 95–104.
International Telecommunications Union, *Recommendations of the CCIR 1990*, vol. XI, part 1, pp. 105–117.

*Primary Examiner*—Safet Metjahic
*Attorney, Agent, or Firm*—Wenderoth, Lind & Ponack

[57] ABSTRACT

A video data transmitter includes: chrominance-data multiplexer which multiplexes parallel data obtained by digitizing a chrominance signal Pb, which is a component signal of an analog HDTV video signal, with parallel data obtained by digitizing a chrominance signal Pr; a word multiplexer which multiplexes parallel data obtained by digitizing a luminance signal Y, which is a component signal of analog HDTV video signal, with the output data of the chrominance-data multiplexer, and a parallel-to-serial converter which converts the parallel data output from the word multiplexer. A video data receiver includes a serial-to-parallel converter which converts received serial data into parallel data and a word separator which separates the output data of the serial-to-parallel converter into parallel data in the Y channel and parallel data in the Pb/Pr channel.

11 Claims, 8 Drawing Sheets

VIDEO-DATA TRANSMITTER, VIDEO-DATA RECEIVER, AND VIDEO-DATA TRANSCEIVER FOR CONNECTING PARALLEL VIDEO-DATA INTO SERIAL VIDEO-DATA AND VICE VERSA

BACKGROUND OF THE INVENTION

1. Field of the Invention

The present invention relates to apparatus for transmitting and receiving video data in a digital signal, particularly a transmitting apparatus that converts parallel video data into serial video data for transmission.

2. Description of the Related Art

Pictures of high quality have been demanded in recent years, and semiconductor technology that supports their realization has been developed, so that video signals are digitized just as audio signals are digitized, and signal processing and recording are often done in digital form. If video data is processed in digital form, then the transmission of the video data is meaningless unless the transmission is also made in digital form. Particularly, high-quality transmission is required in broadcasting equipment.

Further, in data transmission between pieces of broadcasting equipment, connection between them should be easy. Therefore, data form, signal level, and the like are standardized for transmission between pieces of broadcasting equipment. As an example of the standardization, the SMPTE 260M specifications (See SMPTE 260M "Digital Representation and Bit-Parallel Interface-1125/60 High-Definition System" SMPTE Journal. April, 1992) and others have been provided for HDTV signals.

Figure 2:
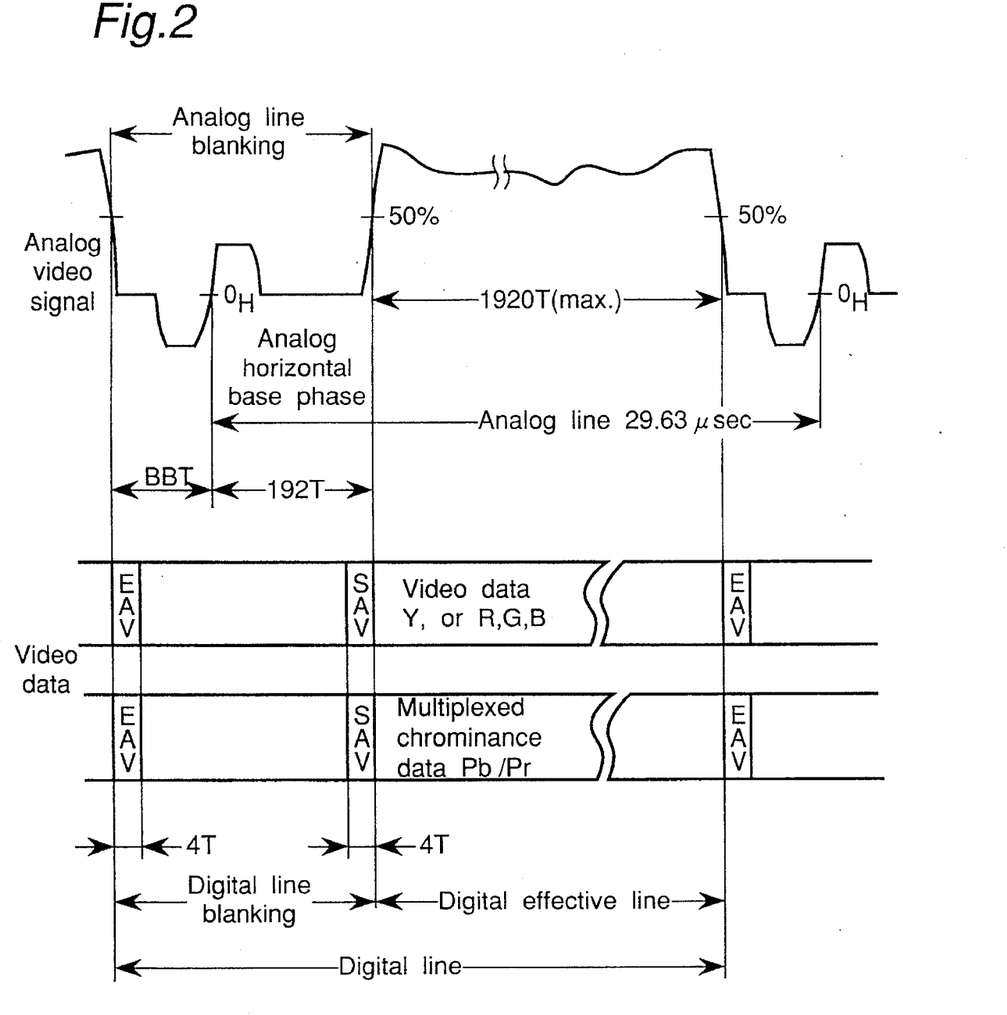
FIG. 2 shows the timing relationship between digitized video data and an analog video signal.
Figure 6:
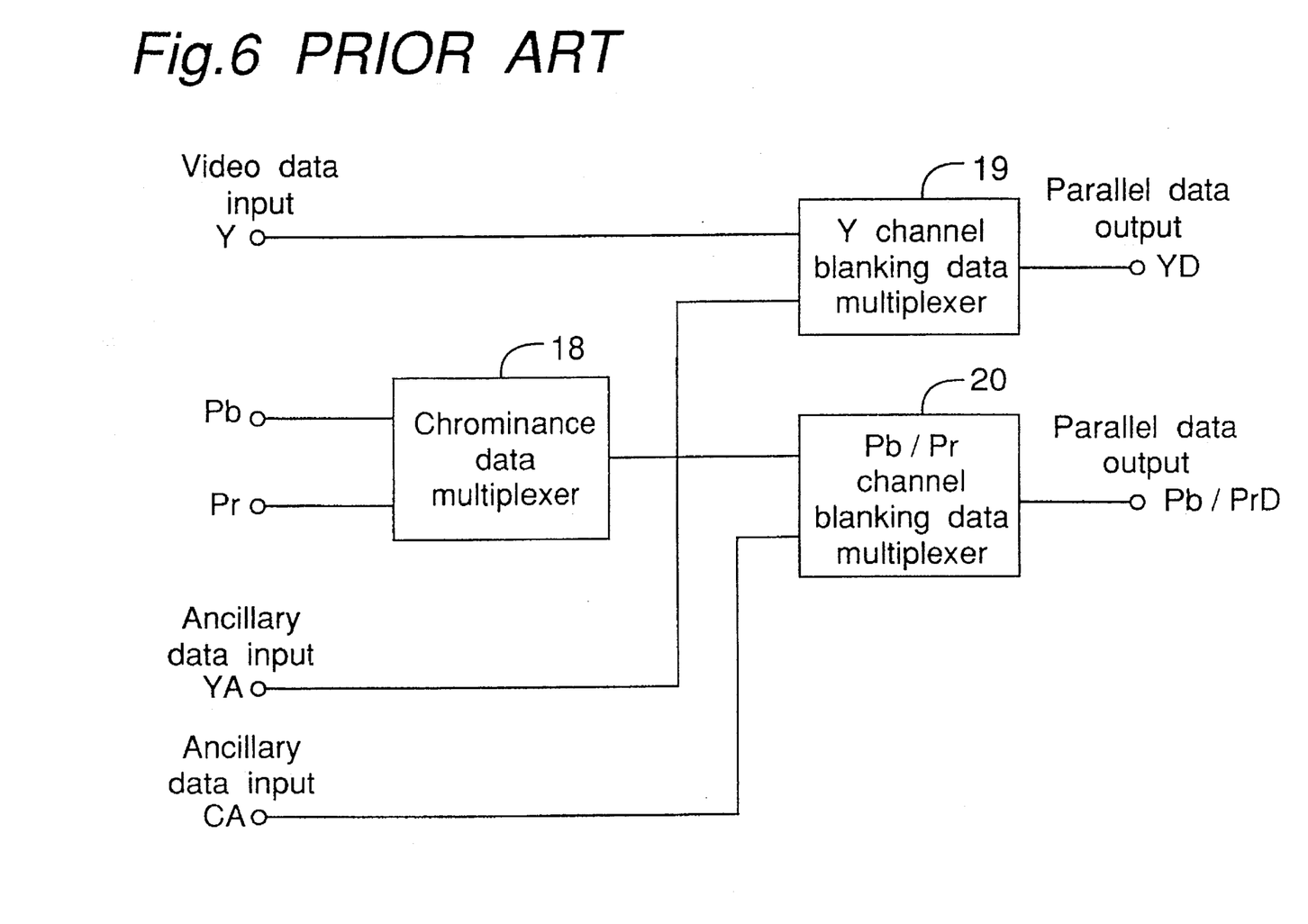
FIG. 6 is a block diagram of a prior art video-data transmitter.
Figure 7:
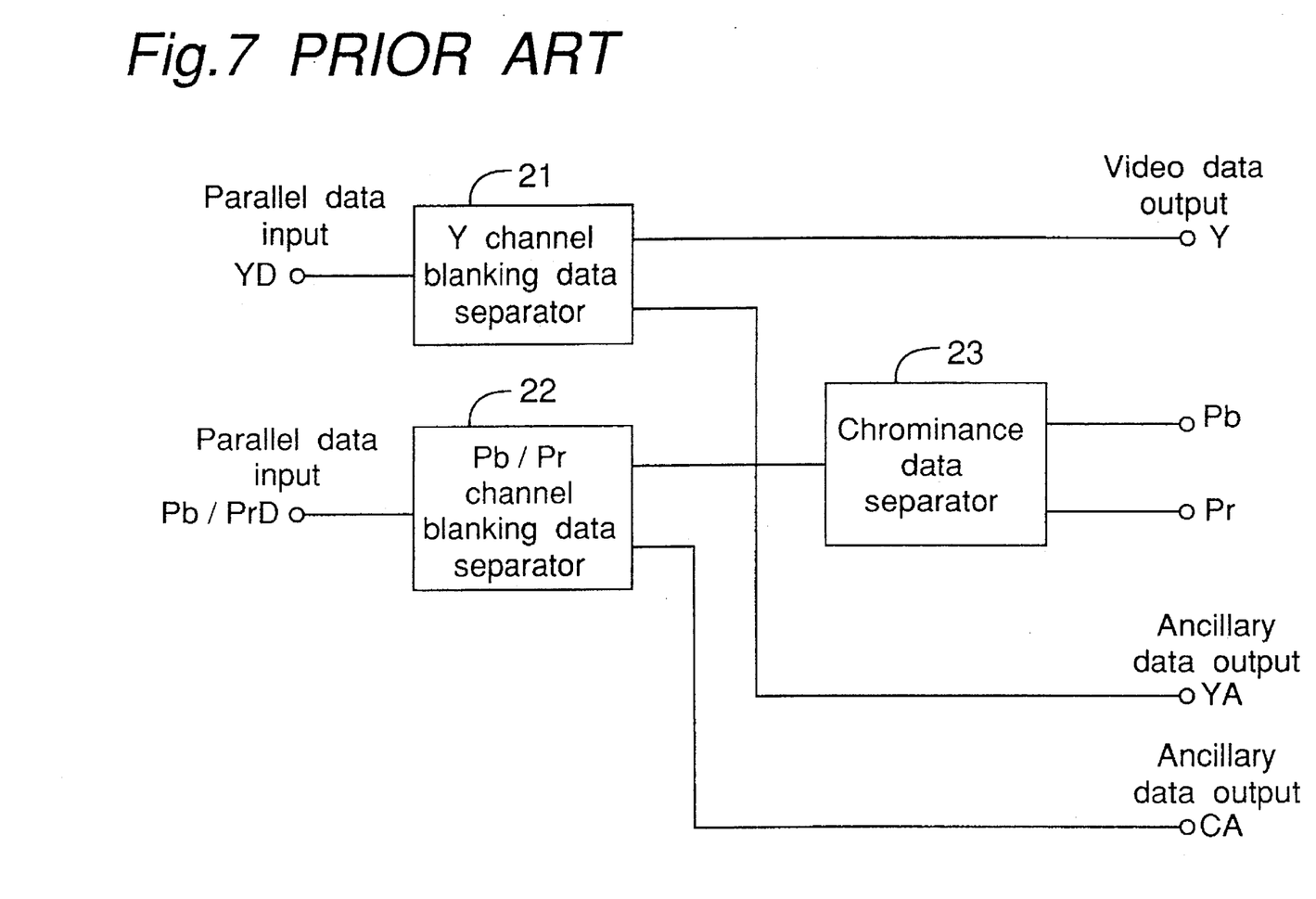
FIG. 7 is a block diagram of a prior art video-data receiver.

In the following, as a prior art example, a method of transmitting an video data following the SMPTE 260M specifications, which are provided as a standard of a bit-parallel interface for HDTV signals, is described with reference to FIGS. 2, 6 and 7. FIG. 6 is a block diagram of a transmitter for transmitting video data in HDTV following the SMPTE 260M specifications. FIG. 7 is a block diagram of a receiver. In the transmitter shown in FIG. 6, Y indicates parallel data obtained by digitizing an analog luminance signal (Y). Similarly, Pb and Pr are respectively parallel data obtained by digitizing analog chrominance signals (Pb) and (Pr). The input data Y is multiplexed with synchronizing codes and ancillary data such as audio data during blanking by a Y-channel blanking-data multiplexer 19 to be output as data YD. The input data Pb and Pr are word-multiplexed by a chrominance-data multiplexer 18 and multiplexed with synchronizing codes and ancillary data such as audio data during blanking by a Pb/Pr-channel blanking-data multiplexer 20 to be output as data Pb/PrD, FIG. 2 shows the timing relationship between an analog video signal and corresponding digital video data multiplexed with synchronizing codes and other data. As shown in FIG. 2, one digital line corresponding to one horizontal period consists of a digital effective line of video data and digital line blanking corresponding to horizontal blanking. Further, the first four words (EAV) and the last four words (SAV) of digital line blanking are timing-reference codes containing synchronizing information. Ancillary data such as audio data can be multiplexed in packet form during the period obtained by removing the EAV and SAV periods from the digital blanking period. On the other hand, in a receiver shown in FIG. 7, synchronizing codes arranged in digital line blanking are detected and ancillary data is separated from the received data YD in a Y-channel blanking-data separator 21. Similarly, synchronizing codes are detected and ancillary data is separated from the received data Pb/PrD by a Pb/Pr-channel blanking-data separator 22. Further, video data extracted from the data Pb/PrD is separated into chrominance data Pr and Pb by a chrominance-data separator 23.

The transmission of video data is made possible by the above means specified by SMPTE 260M. However, the implementation requires a great number of signal lines in the transmission channel. SMPTE 260M specifies that twisted-pair cable with individual shields should be used for signal transmission. Therefore, 42 signal lines in the 10-bit system and 34 signal lines in the 8-bit system are needed in addition to ground lines. These lines are of course accommodated in a single compound cable, which is, however, too thick to be handled easily.

Further, as shown in FIG. 2, in a signal specified by SMPTE 260M, an analog-line-blanking signal is replaced by a digital-line-blanking signal. Therefore, information about the horizontal phase and vertical phase in a video signal is placed in the F bit, V bit, and H bit of the EAV and the SAV.

Table 1 shows the composition of the timing-reference signal.

TABLE 1

| | Composition of timing-base signal | | | | | | | | |
|---|---|---|---|---|---|---|---|---|---|
| | | | | Bit number | | | | | |
| Word Number | 9 MSB | 8 | 7 | 6 | 5 | 4 | 3 | 2 | 1 | 0 LSB |
| 1 | 1 | 1 | 1 | 1 | 1 | 1 | 1 | 1 | 1 |
| 2 | 0 | 0 | 0 | 0 | 0 | 0 | 0 | 0 | 0 |
| 3 | 0 | 0 | 0 | 0 | 0 | 0 | 0 | 0 | 0 |
| 4 | 1 | F | V | H | $P_3$ | $P_2$ | $P_1$ | $P_0$ | 0 | 0 |

Figure 8:
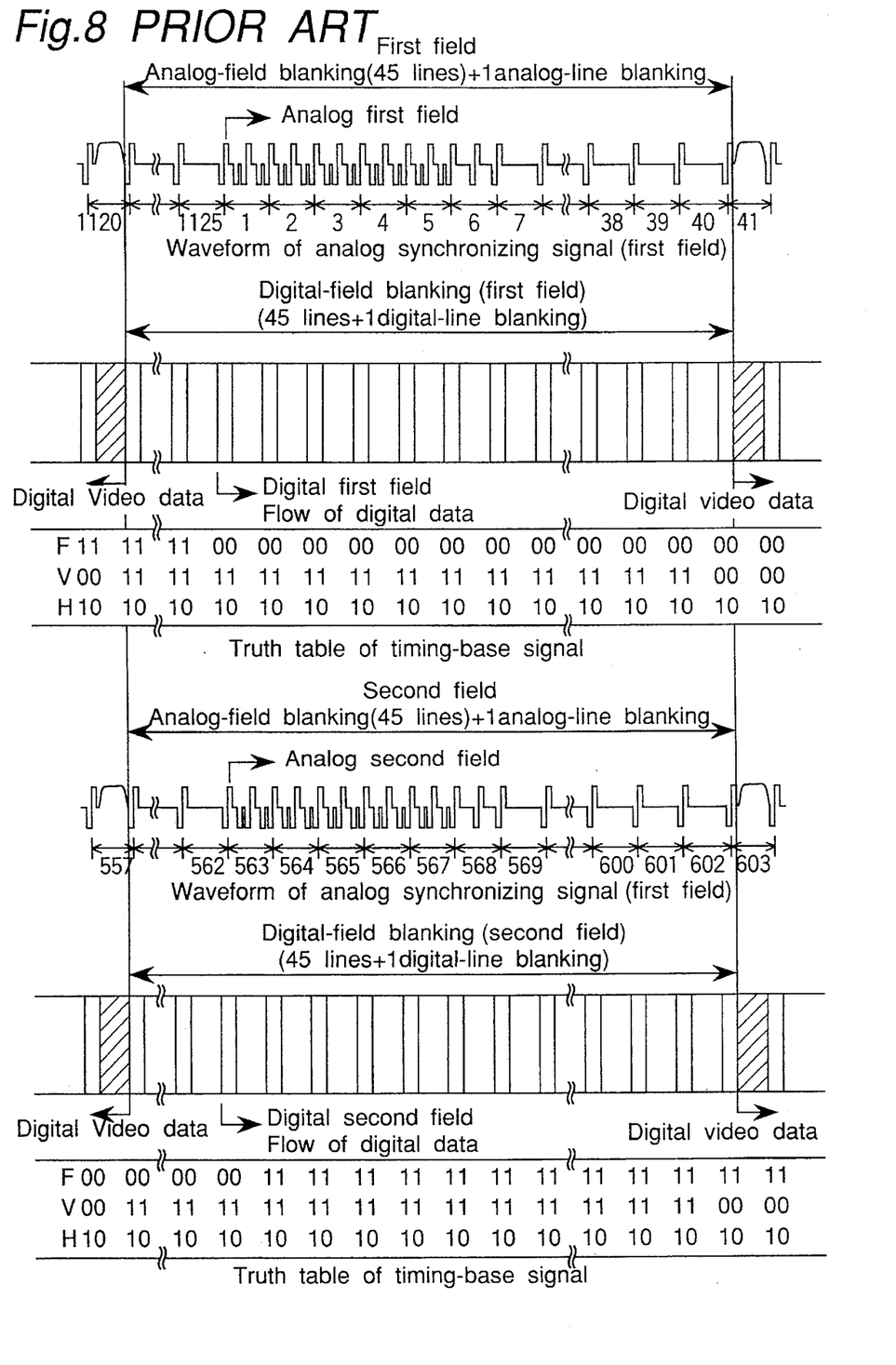
FIG. 8 is a table of truth values in a timing-reference signal.

F = 0: Period of the first field 1: Period of the second field
H = 0: SAV 1: EAV
V = 0: The other period 1: Period of field blanking
$P_0$, $P_1$, $P_2$, $P_3$: Protection bits
MSB: Most significant bit
LSB: Least significant bit In particular, as shown in FIG. 8, vertical-phase information should be read from a change in the F bit that occurs once in 1125 lines and a change in the V bit that occurs three times in 1125 lines.

A receiver of a transceiver reads the vertical-phase information from these changes in the V and F bits, so that once an error occurs in either in a V or F bit, errors continue in several lines to tens of lines.

Further, if the vertical phase of an input signal is changed discontinuously by some causes, it takes several lines to tens of lines before a new vertical phase is attained.

SUMMARY OF THE INVENTION

The first object of the present invention is therefore to provide a video-data transceiver, by simple composition, that transmits video data and others without requiring a great number of signal lines and with a single thin cable.

The second object is to provide a video signal playback apparatus being capable of restoring the vertical synchronization even if the vertical phase of a picture changes discontinuously.

In order to achieve the aforementioned first objective, a transmitter of a transceiver for video data in accordance with the present invention comprises a word multiplexer that multiplexes parallel data in a Y channel with parallel data in a Pb/Pr channel and a parallel-to-serial converter that converts the word-multiplexed parallel data into serial data.

In order to achieve the aforementioned second object, a video-data transmitter of a transceiver for video data in accordance with the present invention comprises a word multiplexer that multiplexes parallel data in a Y channel with parallel data in a Pb/Pr channel, a parallel-to-serial converter that converts the word-multiplexed parallel data into serial data, and a line-number multiplexer that multiplexes a line number with an output from the word multiplexer in each digital blanking period.

In order to achieve the aforementioned first objective, a receiver of a transceiver for video data in accordance with the present invention comprises a serial-to-parallel converter that converts received serial data into parallel data, a horizontal-synchronization detector that monitors the output of the serial-to-parallel converter and outputs a signal for controlling the conversion timing of the serial-to-parallel converter into the serial-to-parallel converter, and a word separator that separates the output data of the serial-to-parallel converter into parallel data in the Y-channel and parallel data in the Pb/Pr channel.

In order to achieve the aforementioned second objective, a receiver of a transceiver for video data in accordance with the present invention comprises a serial-to-parallel converter that converts received serial data into parallel data, a horizontal-synchronization detector that monitors the output of the serial-to-parallel converter and outputs a signal for controlling the conversion timing of the serial-to-parallel converter into the serial-to-parallel converter, and a word separator that separates the output data of the serial-to-parallel converter into parallel data in the Y-channel and parallel data in the Pb/Pr channel, a field-information-signal generator that reads the output data of the serial-to-parallel converter and outputs an F-bit signal and a V-bit signal, a line-number detector that detects a line number from the output of the serial-to-parallel converter, and a vertical-phase-signal generator that determines the vertical synchronization from the output of the line-number detector to generate a vertical-phase signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

An embodiment of a data-multiplex transmitter is described as follows with reference to FIGS. 1, 4, 5, and 6. As a method of multiplexing digitized video data and ancillary data such as digitized audio data, control data for transmission and the like, SMPTE provides encoding and bit-parallel interface specifications (SMPTE 260M) for 1125/60 type HDTV video signals. The description of the present embodiment is based on the specifications.

Figure 1:
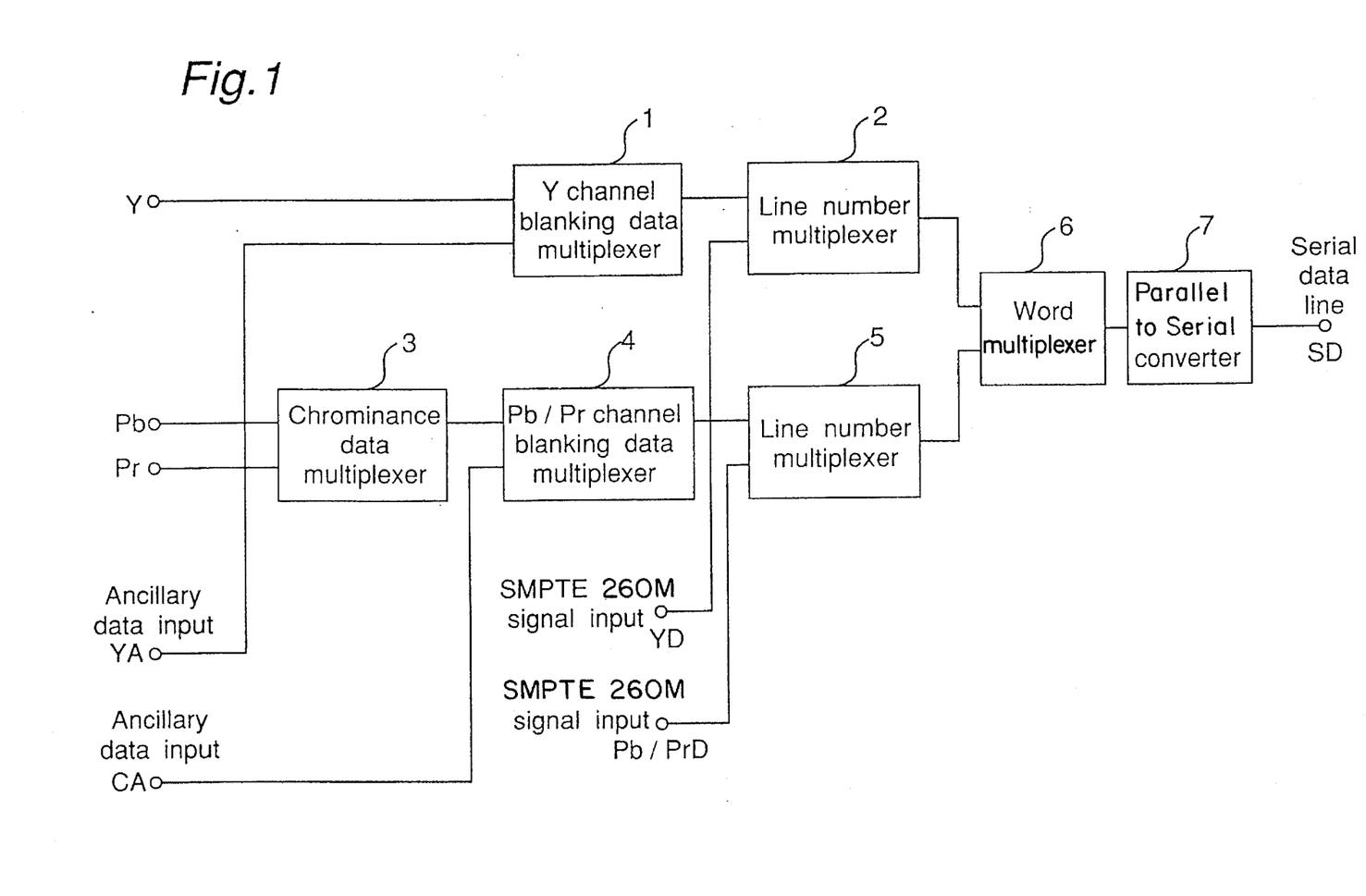
FIG. 1 is a block diagram of a video-data transmitter of an embodiment in accordance with the present invention.

FIG. 1 is a block diagram of a video-data transmitter of an embodiment in accordance with the present invention. Input data Y shown in FIG. 1 is parallel data obtained by converting a luminance signal (Y) of an analog HDTV signal into discrete values using encoding parameters specified by SMPTE 260M. Similarly, Pb and Pr are parallel data obtained by respectively converting chrominance signals (Pb) and (Pt) of an analog HDTV signal into discrete values. In SMPTE 260M the sampling rate for converting the luminance signal into discrete values is 74.25 MHz, and the sampling rate for converting the chrominance signals into discrete values is 37.125 MHz. Of the video data input to the video-data transmitter, the Pb and Pr are word-multiplexed by a chrominance-data multiplexer 3. The word rate of the word-multiplexed parallel data becomes 74.25 MHz, which is the same as that of the data Y.

FIG. 2 shows the timing relationship between an analog video signal and corresponding digital video data, where one horizontal period is defined as one digital line, which is 2200T, if the word rate of the parallel data in the Y channel or the word-multiplexed parallel data in the Pb/Pr channel is T. This digital line consists of a period (1920T) of video data called the digital effective line and a blanking period (280T) called the digital line blanking.

In SMPTE 260M, at the beginning and end of each digital-line-blanking period, two pieces of timing-reference data of 4 words respectively called EAV (End of Active Video) and SAV (Start of Active Video) are inserted, and video data is not transmitted during the digital-line-blanking period, so that ancillary data such as audio data can be multiplexed during this period.

A Y-channel blanking-data multiplexer 1 and a Pb/Pr-channel blanking-data multiplexer 4 write an EAV and a SAV, and respectively multiplex the input ancillary data YA and CA. Here, the output of Y-channel blanking-data multiplexer 1 is defined as data YD, and the output of Pb/Pr-channel blanking-data multiplexer 4 is defined as data Pb/PrD. YD and Pb/PrD are the parallel video data of the bit-parallel interface specified by SMPTE 260M.

A clock signal of 74.25 MHz corresponding to the word rate of the parallel video data is also specified for the bit-parallel interface.

If a signal specified by SMPTE 260M is directly input from the outside, then the blanking data does not need to be multiplexed, so that Y-channel blanking-data multiplexer 1 and Pb/Pr-channel blanking-data multiplexer 4 are unnecessary. In this case, a signal specified by SMPTE 260M coming from the outside is directly input to a line-number multiplexer 2 and a line-number multiplexer 5.

The parallel output data YD of Y-channel blanking-data multiplexer 1 in the Y channel and the parallel output data Pb/Pr of Pb/Pr-channel blanking-data multiplexer 4 are processed by line-number multiplexers 2 and 5 to be multiplexed with a line number between 1 to 1125 immediately after each EAV, where the line number indicates a vertical phase of the HDTV signal.

Figure 3:
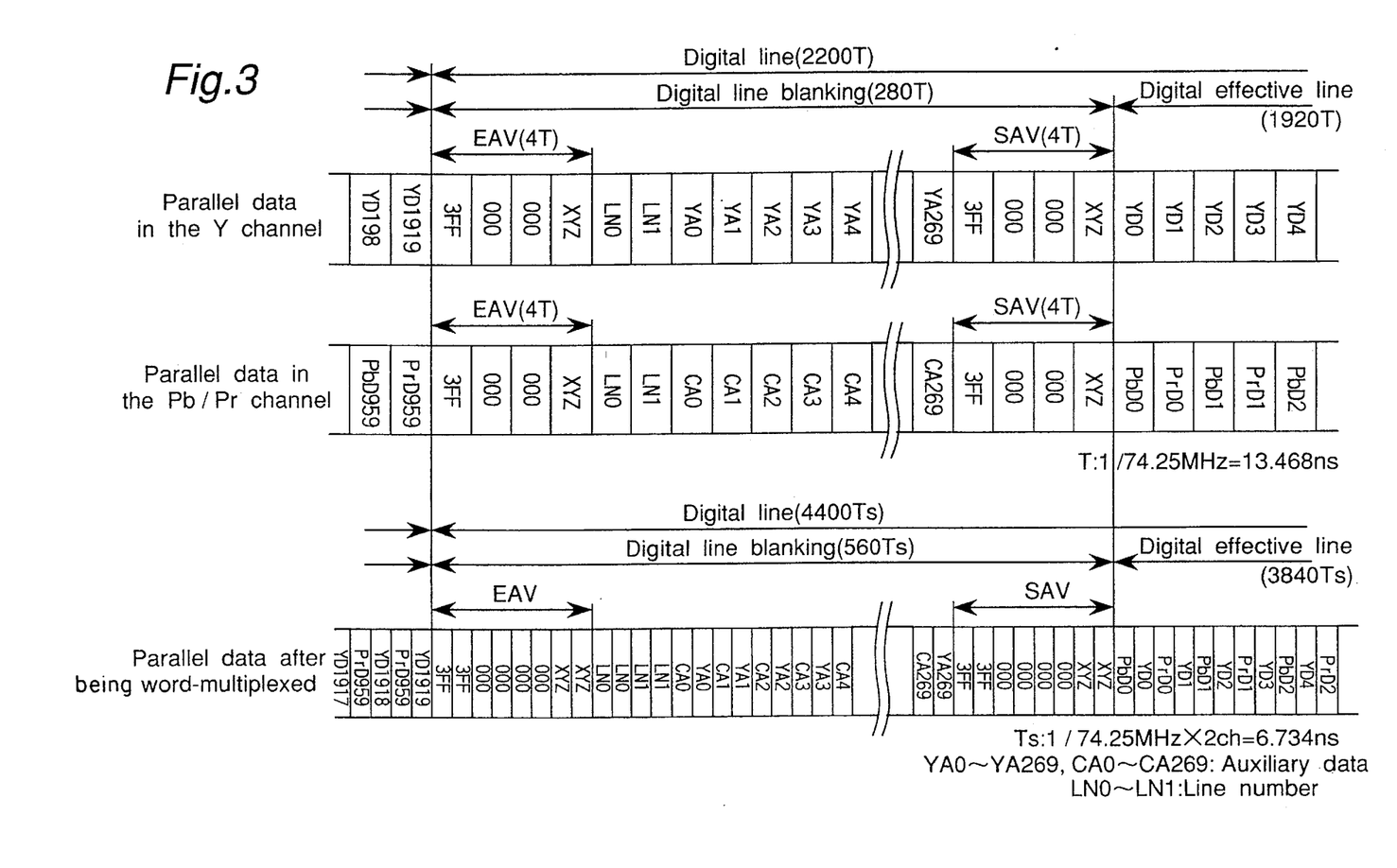
FIG. 3 shows operating waveforms of a Y signal and a corresponding Pb/Pr signal in a video-data transmitter and a video-data receiver of an embodiment in accordance with the present invention.

The data multiplexed with a line number are word-multiplexed in a word multiplexer 6 as shown in FIG. 3. In the resultant parallel word-multiplexed data, the first word in the digital-effective-line period is taken from the data in the Pb/Pr channel, the second word is taken from the data in the Y channel, the third word is taken from the data in the Pb/Pr channel, and this process is repeated successively.

Similarly, in digital line blanking, the first word is taken from the data in the Pb/Pr channel, the second word is taken from the data in the Y channel, the third word is taken from the data in the Pb/Pr channel, and this process is repeated successively. In particular, the first 8 words in digital blanking become an EAV, and the last 8 words become a SAV.

Specifically, the value of the first word of the EAV is 3FF (HEX) taken from the data in the Pb/Pr channel, the value of the second word is 3FF (HEX) taken from the data in the Y channel, the value of the third word is 000 (HEX) taken from the data in the Pb/Pr channel, and a data word taken from each channel is alternately multiplexed successively after that.

Similarly, the 8 words of the SAV are also created by successively multiplexing data words alternately taken from the Pb/Pr channel and the Y channel. FIG. 3 illustrates the result of this process. The parallel data word-multiplexed in this way is then converted into serial data by a parallel-to-serial converter 7 to be output as a serial signal SD.

Before transmission this serial data is often scrambled and randomized for securing timing information and suppressing jitter, and in this case, the additional function can be also assigned to parallel-to-serial converter 7.

The serial signal SD output from the video-data transmitter can be transmitted as an electrical signal. Also it can be transmitted as an optical signal after conversion.

Figure 4:
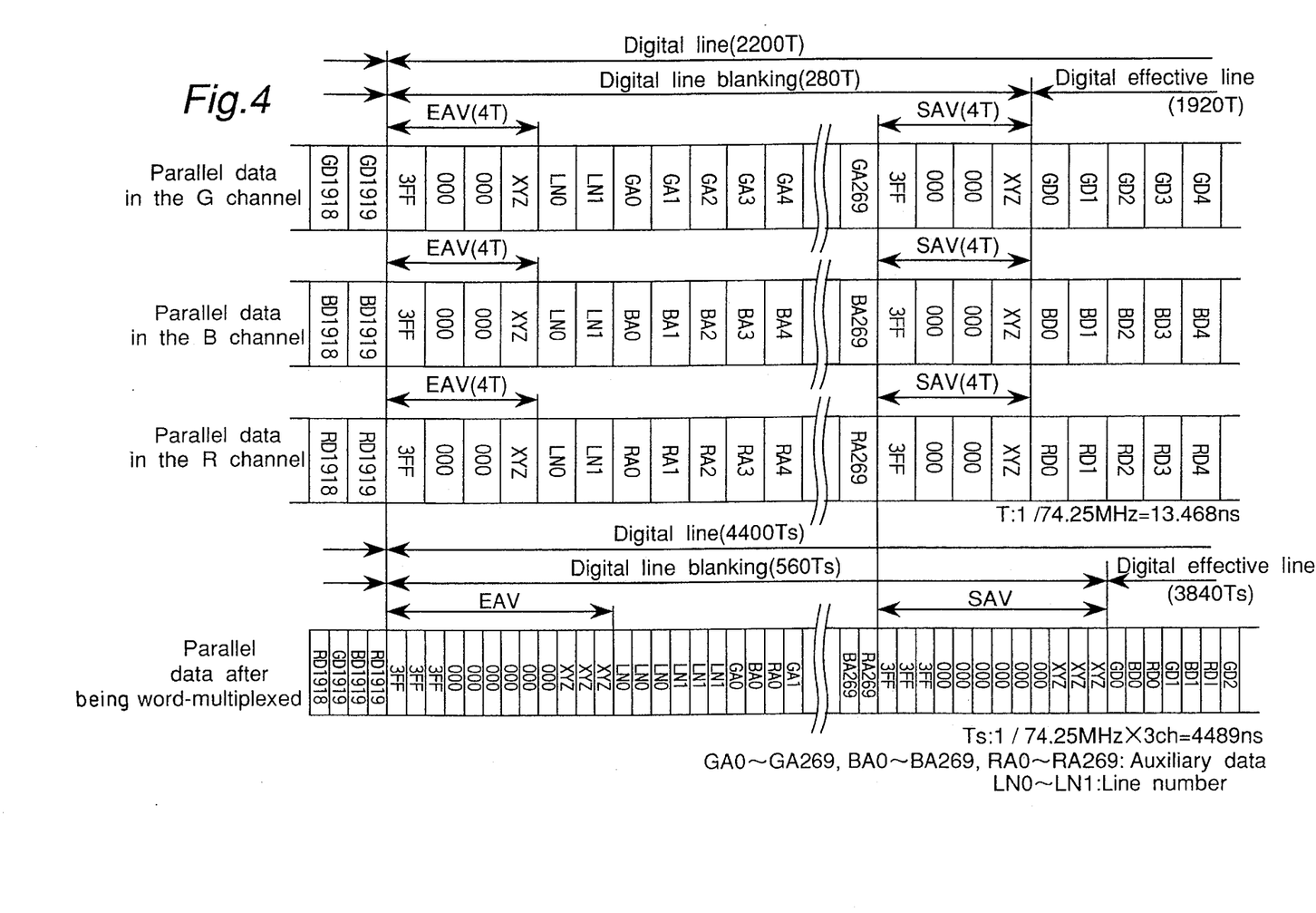
FIG. 4 shows operating waveforms of corresponding R, G, and B signals in a video-data transmitter and a video-data receiver of an embodiment in accordance with the present invention.

The input signal may be a signal obtained by respectively converting analog R, G, B signals into discrete values. In this case, chrominance-data multiplexer 3 becomes unnecessary, and a blanking-data multiplexer is placed in each of the R channel, G channel and B channel. Then, word multiplexer 6 multiplexes the parallel data in the three channels. FIG. 4 illustrates the form of multiplexing in this case.

Figure 5:
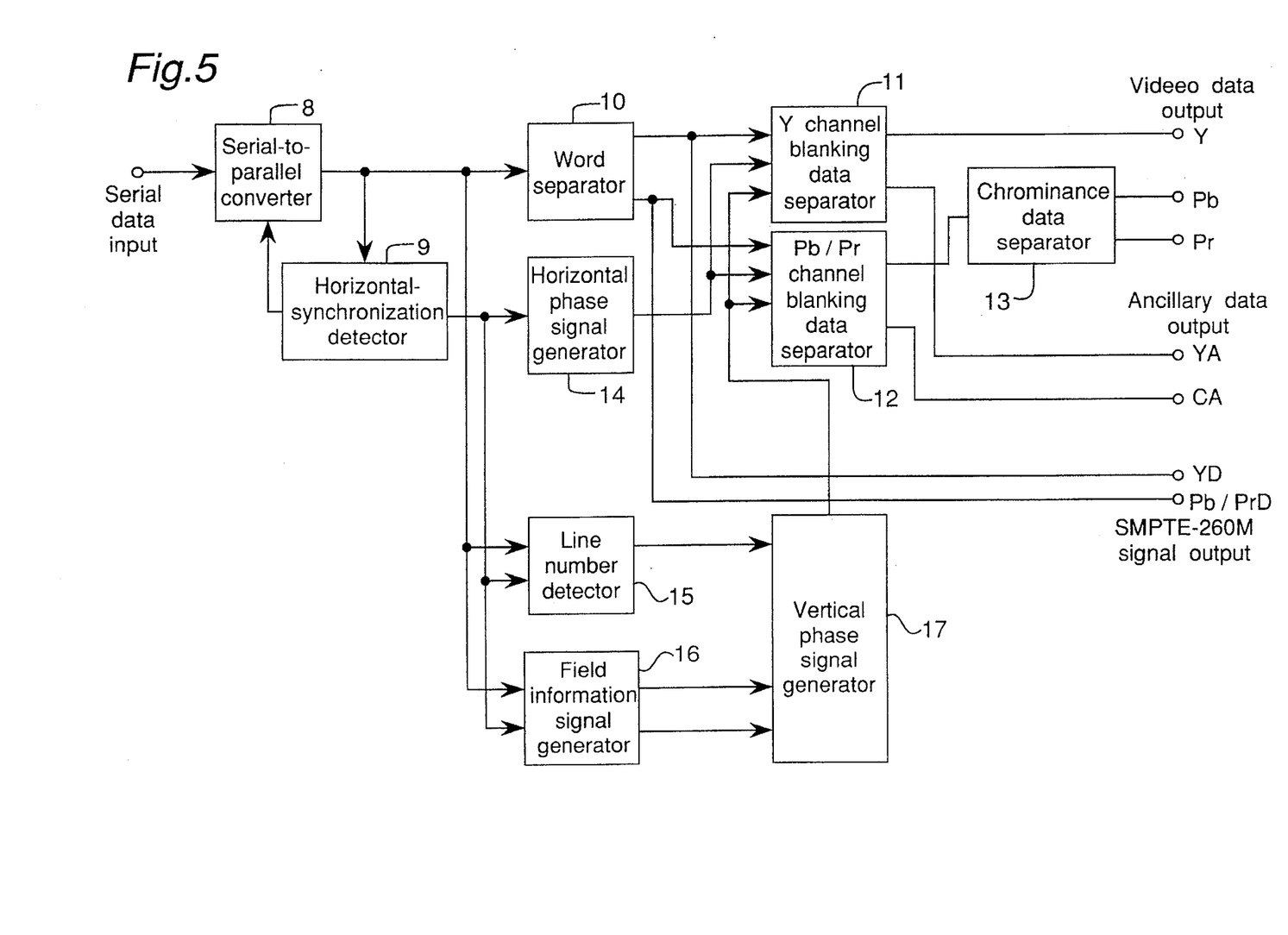
FIG. 5 is a block diagram of a video-data receiver of an embodiment in accordance with the present invention.

An embodiment of a video-data receiver in accordance with the present invention is described as follows with reference to FIG. 5. A serial signal as described above is input to the video-data receiver and converted into parallel data by a serial-to-parallel converter 8. If the input serial data was scrambled by a transmitter, descrambling is performed before the serial data is converted into parallel data.

The parallel data output from serial-to-parallel converter 8 is input to a horizontal-synchronization detector 9, which judges whether or not the timing of the serial-to-parallel conversion is correct. If the timing is not correct, then horizontal-synchronization detector 9 sends a signal to serial-to-parallel converter 8, which alters the timing for serial-to-parallel conversion, so that dislocation of bits is prevented.

Next, the parallel data output from serial-to parallel converter 8 is separated into data in the Y channel and data in the Pb/Pr channel by a word separator 10. The separated data in the Y channel is further separated into the luminance data Y and the ancillary data YA such as audio data and output by a Y-channel blanking-data separator 11.

Horizontal and vertical synchronizing signals are also input to Y-channel blanking-data separator 11, which generates synchronizing signals for digitized video data and multiplexes them in each separated digital blanking period.

As a result, the data Y output from an video data output terminal can be directly converted into an analog luminance signal by a digital-to-analog converter.

Similarly, the data in the Pb/Pr channel separated by word separator 10 is separated into chrominance data Pb/Pr and ancillary data CA by a Pb/Pr-channel blanking-data separator 12.

Horizontal and vertical synchronizing signals are also input to Pb/Pr-channel blanking-data separator 12, which multiplexes synchronizing signals for digitized video data. The chrominance data Pb/Pr output from Pb/Pr-channel blanking-data separator 12 is further separated into a Pb signal and a Pr signal and output by a chrominance-data separator 13.

As a result, the Pb signal and the Pr signal output from chrominance-data separator 13 can be directly converted into analog chrominance signals by a digital-to-analog converter.

Also, the output of word separator 10 is a signal specified by SMPTE 260M.

If only SMPTE 260M signal outputs YD and Pb/PrD are necessary, the above Y-channel blanking-data separator 11 and Pb/Pr-channel blanking-data separator 12 become unnecessary.

In this embodiment, a signal specified by SMPTE 260M is output by making word separator 10 output data as is.

Horizontal-synchronization detector 9 detects horizontal synchronization by detecting an EAV in a signal that has not been word-separated yet and outputs a horizontal-synchronization-detection signal.

A line-number detector 15 detects and outputs a line number from the horizontal-synchronization-detection signal and an output of serial-to-parallel converter 8. The line number is placed immediately after an EAV, so that it can be extracted from the parallel data based on the input timing of the horizontal-synchronization-detection signal.

A horizontal-phase-signal generator 14 outputs a horizontal-phase signal based on the horizontal-synchronization-detection signal output from horizontal-synchronization detector 9. The horizontal-phase-signal generator 14 outputs one of numbers from 1 to 2200, each of which indicates a horizontal phase of the input digital video signal.

A field-information-signal generator 16 reads the horizontal-synchronization-detection signal output from horizontal-synchronization detector 9 and the output of serial-to-parallel converter 8 to output F and V bits of the EAV.

A vertical-phase-signal generator 17 outputs a vertical-phase signal of the digital video signal based on changes in F and V bits and an input line number.

Vertical-phase-signal generator 17 outputs the vertical phase of a digital video signal using F and V bits as well as line numbers. If correct transmission is performed, an F bit and a V bit are transmitted corresponding to each line number. Therefore, if an input line number coincides with a vertical phase indicated by the F and V bits, then it is judged that a correct transmission has been performed, so that the input line number is output as is. If the input line number does not coincide with the vertical phase indicated by the F and V bits, then it is judged that the input line number is incorrect, so that the line number obtained by incrementing the immediately preceding line number by one is output as a new line number. In this way, generation of an incorrect vertical phase is prevented.

As a result, unlike the method of generating a vertical phase using only F and V bits, the present method of generating a vertical phase using an input line number can rapidly generate a correct new vertical phase, even if a vertical phase of a video signal becomes discontinuous owing to some cause.

Y-channel blanking-data separator 11 and Pb/Pr-channel blanking-data separator 12 can multiplex digital video synchronizing signals digitized in the digital blanking period using an input horizontal-phase signal and a vertical-phase signal. The result is output, as is, through an video data output terminal.

In the present embodiment, blanking data was separated, and blanking data and video synchronizing signals were replaced. Further, a Pb/Pr-chrominance signal was separated into a Pb signal and a Pr signal. If a signal specified in SMPTE 260M is to be output without separation, the Y-channel blanking-data separator, Pr/Pb-channel blanking-data separator, and Pb/Pr-data separator are not necessary.

If three channels of R, G, and B exist, the word separator separates the data into the three channels of R, G, and B. Further, if ancillary data exits, a blanking-data separator is added to each channel, and the chrominance-data separator becomes unnecessary.

Finally, an embodiment of a video-data transceiver is described briefly. The video data transceiver transmits video data output from a video-data transmitter described above to a video-data receiver described above through optical fiber or coaxial cable. The compositions of the video-data transmitter and the video-data receiver can be varied as described above.

The present embodiment can reduce the number of signal lines that connect a video-data transmitter and a video-data receiver.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A video data receiver comprising:
    a serial data input terminal for receiving serial data including at least G, B and R signals specified according to SMPTE 260M;
    a serial to parallel signal converter for converting said serial data into parallel data;
    a horizontal synchronization detection circuit for outputting a signal for controlling conversion timing of said serial to parallel converter based on an output from said serial to parallel converter;
    a word separation circuit for separating an output of said serial to parallel signal converter into parallel signal data of G, B and R channels;
    a field information signal generation circuit for detecting an F bit and a V bit from the output of said serial to parallel signal converter;
    a line number detection circuit for detecting line numbers from the output of said serial to parallel signal converter;
    a vertical phase signal generation circuit for detecting a vertical phase from outputs of said field information signal generation circuit and said line number detection circuit;
    blanking data separation circuits G, B and R channels, each separating ancillary data from a corresponding output of said word separation circuit and multiplexing a digital video synchronizing signal generated by each blanking data separation circuit, wherein multiplexing of the digital video synchronizing signal is performed in each of said blanking data separation circuits for G, B and R channels in accordance with an output of said vertical phase signal generation circuit, and an output of said word separation circuit includes G, B and R signals of a bit parallel interface signal formatted according to SMPTE 260M.

2. A video data transmitter comprising:
    a Pb signal input terminal for inputting parallel data obtained by transforming a chromatic signal Pb as a component signal of an HDTV analog signal into a digital signal;
    a Pr signal input terminal for inputting parallel data obtained by transforming a chromatic signal Pr as a component signal of an HDTV analog signal into a digital signal;
    a Y signal input terminal for inputting parallel data obtained by transforming a luminance signal Y as a component signal of an HDTV analog signal into a digital signal;
    a Pb/Pr signal ancillary data input terminal for inputting Pb/Pr signal ancillary data to be multiplexed in a Pb/Pr digital blanking interval;
    a Y signal ancillary data input terminal for inputting Y signal ancillary data to be multiplexed in a digital blanking interval;
    a chromatic data multiplexer for multiplexing Pb and Pr signals input from said Pb and Pr signal input terminals;
    a Pb/Pr channel blanking data multiplexer for multiplexing said Pb/Pr signal ancillary data with a Pb/Pr signal multiplexed by said chromatic data multiplexer in the Pb/Pr digital blanking interval;
    a Y channel blanking data multiplexer for multiplexing said Y signal ancillary data with said Y signal in the Y signal digital blanking interval;
    a Pb/Pr line number multiplexer for multiplexing an output from said Pb/Pr channel blanking multiplexer with line numbers of said Pb and Pr signals;
    a Y line number multiplexer for multiplexing an output with a line number from said Y channel blanking multiplexer with a line number of said Y signal;
    a word-multiplexer for multiplexing outputs from said Pb/PR line number multiplexer and Y line number multiplexer;
    a parallel to serial signal converter for parallel to serial converting an output from said word-multiplexer; and
    a serial data output terminal for outputting serial data output from said parallel to serial signal converter.

3. The video data transmitter according to claim 2, wherein line numbers of said Pb, Pr and Y signals are respectively specified according to SMPTE 260M.

4. A video data transmitter comprising:

a Y signal input terminal for inputting a Y signal included in a bit parallel interface signal specified according to SMPTE 260M;

a Pb/Pr signal input terminal for inputting a Pb/Pr signal included in said bit parallel interface signal;

a Y signal line number multiplexer for multiplexing a line number of the input Y signal to the input Y signal;

a Pb/Pr signal line number multiplexer for multiplexing a line number of the input Pb/Pr signal to the input Pb/Pr signal;

a word-multiplexer for multiplexing outputs from said Y signal line number multiplexer and said Pb/Pr signal line number multiplexer;

a parallel to serial signal converter for converting parallel data output from said word-multiplexer into serial data; and a serial signal output terminal for outputting the serial data output from said parallel to serial signal converter.

5. A video data transmitter comprising;

G, B and R signal input terminals for inputting G, B and R signals included in bit parallel interface signals of G, B and R system respectively specified according to SMPTE 260M;

G, B and R signal ancillary data input terminals for inputting G, B and R ancillary data;

G, B and R channel blanking data multiplexers for respectively multiplexing said G, B and R signal ancillary data with said G, B and R signals in a digital blanking interval;

a Pb/Pr line number multiplexer for multiplexing each output from said Pb/Pr channel blanking multiplexer with a line number of said Pb and Pr signal, each of said outputs being a bit parallel interface signal specified according to SMPTE 260M;

a Y line number multiplexer for multiplexing each output from said Y channel blanking multiplexer with a line number of said Y signal, each of said outputs being a bit parallel interface signal specified according to SMPTE 260M;

a word-multiplexer for multiplexing outputs from said Pb/Pr line number multiplexer and Y line number multiplexer;

G, B and R line number multiplexers for respectively multiplexing outputs from said G, B and R channel blanking data multiplexers with line numbers of said G, B and R signals; respectively, a word multiplexer for word-multiplexing outputs of said G, B and R line number multiplexers;

a parallel to serial signal converter for converting an output of said word multiplexer into a serial signal; and a serial signal output terminal for outputting the serial signal.

6. A video data receiver comprising:

a serial data input terminal for receiving a serial signal data which is a bit parallel interface signal specified according to SMPTE 260M;

a serial to parallel signal converter for converting said serial signal data into parallel signal data;

a horizontal synchronization detection circuit for receiving parallel signal data output from said serial to parallel signal converter and outputting a signal for controlling a conversion timing of said serial to parallel converter;

a word-separation circuit for separating output data of said serial to parallel signal converter into parallel signal data of a Y channel and parallel signal data of a Pb/Pr channel;

a Y channel blanking data separation circuit for separating ancillary data from the parallel signal data of a Y channel output from said word separation circuit and multiplexing a digital video synchronizing signal generated by said Y channel blanking data separation circuit;

a Pb/Pr channel blanking data separation circuit for separating ancillary data from the parallel signal data of a Pb/Pr channel output from said word separation circuit and multiplexing a digital video synchronizing signal generated by said Pb/Pr channel blanking data separation circuit;

a chromatic data separation circuit for separating the parallel signal of a Pb/Pr channel, from which the ancillary data have been separated, into chromatic data corresponding to Pb and chromatic data corresponding to Pr;

a line number detection circuit for detecting line numbers included in output data of said serial to parallel converter;

a vertical phase signal generation circuit for detecting a vertical phase based on an output of said line number detection circuit and outputting a vertical phase signal corresponding to the detected vertical phase;

a Y signal output terminal for outputting the parallel data of a Y channel from which the ancillary data have been separated;

a Pb signal output terminal for outputting the parallel data corresponding to a Pb output from said chromatic data separation circuit; and a Pr signal output terminal for outputting the parallel data corresponding to a Pr output from said chromatic data separation circuit;

wherein an output of said vertical phase signal generation circuit is input to said Y channel blanking data separation circuit and Pb/Pr channel blanking data separation circuit;

and wherein a multiplexing of the digital image synchronizing signal is performed in accordance with an output of said vertical phase signal generation circuit, and an output signal of said word separation circuit is a Y signal and a Pb/Pr signal of a bit parallel interface signal formatted according to SMPTE 260M.

7. The video data receiver as claimed in claim 6, further comprising a field information signal generation circuit for detecting an F bit and a V bit from output data of said serial to parallel converter, said F bit and V bit being input to said vertical phase signal generation circuit to generate the vertical phase signal together with an output from said line number detection circuit.

8. The video data receiver as claimed in claim 6, further comprising:

a Y signal ancillary data output terminal for outputting ancillary data of a Y channel separated by said Y channel blanking data separation circuit, and a Pb/Pr signal ancillary data output terminal for outputting ancillary data of a Pb/Pr channel separated by said Pb/Pr channel blanking data separation circuit.

9. A video data transceiver having a video data transmitter, a video data receiver and a transmission line for transmitting video data output from said video data transmitter to said video data receiver;

said video data transmitter comprising:

a Pb signal input terminal for inputting parallel data obtained by transforming a chromatic signal Pb as a component signal of an HDTV analog signal into a digital signal;

a Pr signal input terminal for inputting parallel data obtained by transforming a chromatic signal Pr as a component signal of an HDTV analog signal into a digital signal;

a Y signal input terminal for inputting parallel data obtained by transforming a luminance signal Y as a component signal of an HDTV analog signal into a digital signal;

a Pb/Pr signal ancillary data input terminal for inputting Pb/Pr signal ancillary data to be multiplexed in a Pb/Pr digital blanking interval;

a Y signal ancillary data input terminal for inputting Y signal ancillary data to be multiplexed in a digital blanking interval;

a chromatic data multiplexer for multiplexing Pb and Pr signals input from said Pb and Pr signal input terminals;

a Pb/Pr channel blanking data multiplexer for multiplexing said Pb/Pr signal ancillary data with a Pb/Pr signal multiplexed by said chromatic data multiplexer in the Pb/Pr digital blanking interval;

a Y channel blanking data multiplexer for multiplexing said Y signal ancillary data with said Y signal in the Y signal digital blanking interval;

a Pb/Pr line number multiplexer for multiplexing an output from said Pb/Pr channel blanking multiplexer with line numbers of said Pb and Pr signals;

a Y line number multiplexer for multiplexing an output from said Y channel blanking multiplexer with a line number of said Y signal;

a word-multiplexer for multiplexing outputs from said Pb/Pr line number multiplexer and Y line number multiplexer;

a parallel to serial signal converter for parallel to serial-converting an output from said word-multiplexer; and a serial data output terminal for outputting serial data output from said parallel to serial signal converter; and said video data receiver comprising:

a serial data input terminal for receiving a serial signal data which is a bit parallel interface signal specified according to SMPTE 260M;

a serial to parallel signal converter for converting said serial signal data into parallel signal data;

a horizontal synchronization detection circuit for receiving parallel signal data output from said serial to parallel signal converter and for outputting a signal for controlling a conversion timing of said serial to parallel converter;

a word-separation circuit for separating output data of said serial to parallel signal converter into parallel signal data of a Y channel and parallel signal data of a Pb/Pr channel;

a Y channel blanking data separation circuit for separating ancillary data from the parallel signal data of a Y channel output from said word separation circuit and multiplexing a digital video synchronizing signal generated by said Y channel blanking data separation circuit;

a Pb/Pr channel blanking data separation circuit for separating ancillary data from the parallel signal data of Pb/Pr channel output from said word separation circuit and for multiplexing a digital video synchronizing signal generated by said Pb/Pr channel blanking data separation circuit;

a chromatic data separation circuit for separating the parallel signal of a Pb/Pr channel, from which the ancillary data have been separated, into chromatic data corresponding to Pb and chromatic data corresponding to Pr;

a line number detection circuit for detecting line numbers included in output data of said serial to parallel converter;

a vertical phase signal generation circuit for detecting a vertical phase based on an output of said line number detection circuit and for outputting a vertical phase signal corresponding to the detected vertical phase;

a Y signal output terminal for outputting the parallel data of a Y channel from which the ancillary data have been separated;

a Pb signal output terminal for outputting the parallel data corresponding to a Pb output from said chromatic data separation circuit; and a Pr signal output terminal for outputting the parallel data corresponding to Pr output from said chromatic data separation circuit;

wherein an output of said vertical phase signal generation circuit is input to said Y channel blanking data separation circuit and Pb/Pr channel blanking data separation circuit;

and wherein multiplexing of the digital image synchronizing signal is performed in accordance with an output of said vertical phase signal generation circuit, and an output signal of said word separation circuit is Y signal and a Pb/Pr signal of a bit parallel interface signal formatted according to SMPTE 260M.

10. A video data transceiver having a video data transmitter, a video data transceiver and a transmission line for transmitting video data output from said video data transmitter to said video data receiver;

said video data transmitter comprising:

a Y signal input terminal for inputting a Y signal included in a bit parallel interface signal specified according to SMPTE 260M;

a Pb/Pr signal input terminal for inputting a Pb/Pr signal included in said bit parallel interface signal;

a Y signal line number multiplexer for multiplexing a line number of the input Y signal to the input Y signal;

a Pb/Pr signal line number multiplexer for multiplexing a line number of the input Pb/Pr signal to the input Pb/Pr signal;

a word-multiplexer for multiplexing outputs from said Y signal line number multiplexer and said Pb/Pr signal line number multiplexer;

a parallel to serial signal converter for converting parallel data output from said word-multiplexer into serial data; and a serial signal output terminal for outputting the serial data output from said parallel to serial signal converter; and said video data receiver comprising:

a serial data input terminal for receiving a serial signal data which is a bit parallel interface signal specified according to SMPTE 260M;

a serial to parallel signal converter for converting said serial signal data into parallel signal data;

a horizontal synchronization detection circuit for receiving parallel signal data output from said serial to parallel signal converter and for outputting a signal for controlling a conversion timing of said serial to parallel converter;

a word-separation circuit for separating output data of said serial to parallel signal converter into parallel signal data of a Y channel and parallel signal data of a Pb/Pr channel;

a Y channel blanking data separation circuit for separating ancillary data from the parallel signal data of Y channel output from said word separation circuit and for multiplexing a digital video synchronizing signal generated by said Y channel blanking data separation circuit;

a Pb/Pr channel blanking data separation circuit for separating ancillary data from the parallel signal data of Pb/Pr channel output from said word separation circuit and for multiplexing a digital video synchronizing signal generated by said Pb/Pr channel blanking data separation circuit;

a chromatic data separation circuit for separating the parallel signal of a Pb/Pr channel, from which the ancillary data have been separated, into chromatic data corresponding to Pb and chromatic data corresponding to Pr;

a line number detection circuit for detecting line numbers included in output data of said serial to parallel converter;

a vertical phase signal generation circuit for detecting a vertical phase based on an output of said line number detection circuit and for outputting a vertical phase signal corresponding to the vertical phase detected;

a Y signal output terminal for outputting the parallel data of a Y channel from which the ancillary data have been separated;

a Pb signal output terminal for outputting the parallel data corresponding to a Pb output from said chromatic data separation circuit; and a Pr signal output terminal for outputting the parallel data corresponding to a Pr output from said chromatic data separation circuit;

wherein an output of said vertical phase signal generation circuit is input to said Y channel blanking data separation circuit and Pb/Pr channel blanking data separation circuit;

and wherein multiplexing of the digital image synchronizing signal is performed in accordance with an output of said vertical phase signal generation circuit, and an output signal of said word separation circuit is a Y signal and a Pb/Pr signal of a bit parallel interface signal formatted according to SMPTE 260M.

11. A video data transceiver having a video data transmitter, a video data receiver and a transmission line for transmitting video data output from said video data transmitter to said video data receiver;

said video data transmitter comprising:

G, B and R signal input terminals for inputting G, B and R signals included in a bit parallel interface signals of G, B and R system respectively specified according to SMPTE 260M;

G, B and R signal ancillary data input terminals for inputting G, B and R ancillary data;

G, B and R channel blanking data multiplexers for respectively multiplexing said G, B and R signal ancillary data with said G, B and R signals in a digital blanking interval;

a Pb/Pr line number multiplexer for multiplexing each output from said Pb/Pr channel blanking multiplexer with a line number of said Pb and Pr signal, each of said outputs being a bit parallel interface signal specified according to SMPTE 260M;

a Y line number multiplexer for multiplexing each output from said Y channel blanking multiplexer with a line number of said Y signal, each of said outputs being a bit parallel interface signal specified according to SMPTE 260M;

a word-multiplexer for multiplexing outputs from said Pb/Pr line number multiplexer and Y line number multiplexer;

G, B and R line number multiplexers for respectively multiplexing outputs from said G, B and R channel blanking data multiplexers with line numbers of said G, B and R signals;

a word multiplexer for word-multiplexing outputs of said G, B and R line number multiplexers;

a parallel to serial signal converter for converting an output of said word multiplexer into a serial signal; and a serial signal output terminal for outputting the serial signal; and said video data receiver comprising:

a serial data input terminal for receiving serial data including at least G, B and R signals specified according to SMPTE 260M;

a serial to parallel signal converter for converting said serial data into parallel data;

a horizontal synchronization detection circuit for outputting a signal for controlling conversion timing of said serial to parallel converter based on an output from said serial to parallel converter;

a word separation circuit for separating an output of said serial to parallel signal converter parallel signal data of G, B and R channels;

a field information signal generation circuit for detecting an F bit and a V bit from the output of said serial to parallel signal converter;

a line number detection circuit for detecting line numbers from the output of said serial to parallel signal converter;

a vertical phase signal generation circuit for detecting a vertical phase from outputs of said field information signal generation circuit and said line number detection circuit;

blanking data separation circuits for G, B and R channels, each separating ancillary data from a corresponding output of said word separation circuit and multiplexing a digital video synchronizing signal generated by each blanking data separation circuit, wherein multiplexing of the digital video synchronizing signal is performed in each of said blanking data separation circuits for G, B and R channels in accordance with an output of said vertical phase signal generation circuit, and an output of said word separation circuit includes G, B and R signals of a bit parallel interface signal formatted according to SMPTE 260M.

* * * * *